(12) United States Patent
Jensen et al.

(10) Patent No.: US 6,326,752 B1
(45) Date of Patent: Dec. 4, 2001

(54) METHOD FOR THE COMMUTATION OF A POLYPHASE PERMANENT MAGNET MOTOR

(75) Inventors: Niels Due Jensen; Jan Caroe Aarestrup, both of Bjerringbro (DK)

(73) Assignee: Grundfos A/S (DE)

( * ) Notice: Subject to any disclaimer, the term of this patent is extended or adjusted under 35 U.S.C. 154(b) by 0 days.

(21) Appl. No.: 09/471,656

(22) Filed: Dec. 24, 1999

(30) Foreign Application Priority Data

Dec. 28, 1998 (DE) .............................................. 198 60 448

(51) Int. Cl.⁷ .......................... H01R 39/46; H02K 13/00; H02P 7/50
(52) U.S. Cl. ........................... 318/439; 318/254; 318/138
(58) Field of Search .................................. 318/439, 138, 318/254, 720–724

(56) References Cited

U.S. PATENT DOCUMENTS

| | | |
|---|---|---|
| 4,654,566 | 3/1987 | Erdman . |
| 4,743,815 * | 5/1988 | Gee et al. .............................. 318/254 |
| 5,783,917 * | 7/1998 | Takekawa .............................. 318/439 |
| 5,929,577 * | 7/1999 | Neidorff et al. ...................... 318/254 |
| 5,969,491 * | 10/1999 | Viti et al. .............................. 318/254 |
| 6,034,493 * | 3/2000 | Boyd et al. ........................... 318/254 |
| 6,081,084 * | 6/2000 | Crecelius .............................. 318/254 |

FOREIGN PATENT DOCUMENTS 0 801 463 A1    4/1997    (EP) .

* cited by examiner

Primary Examiner—Robert E. Nappi
Assistant Examiner—Edgardo San Martin
(74) Attorney, Agent, or Firm—Jacox, Meckstroth & Jenkins

(57) ABSTRACT

The method serves the commutation of an electrically commutated brushless, polyphase permanent magnet motor. The commutation angle, i.e. the angle from the zero crossing of the BEMF signal up to the reapplication of the voltage to the same winding is determined by the angle which results when the winding phase current has reached zero until the zero crossing of the BEMF signal.

4 Claims, 1 Drawing Sheet

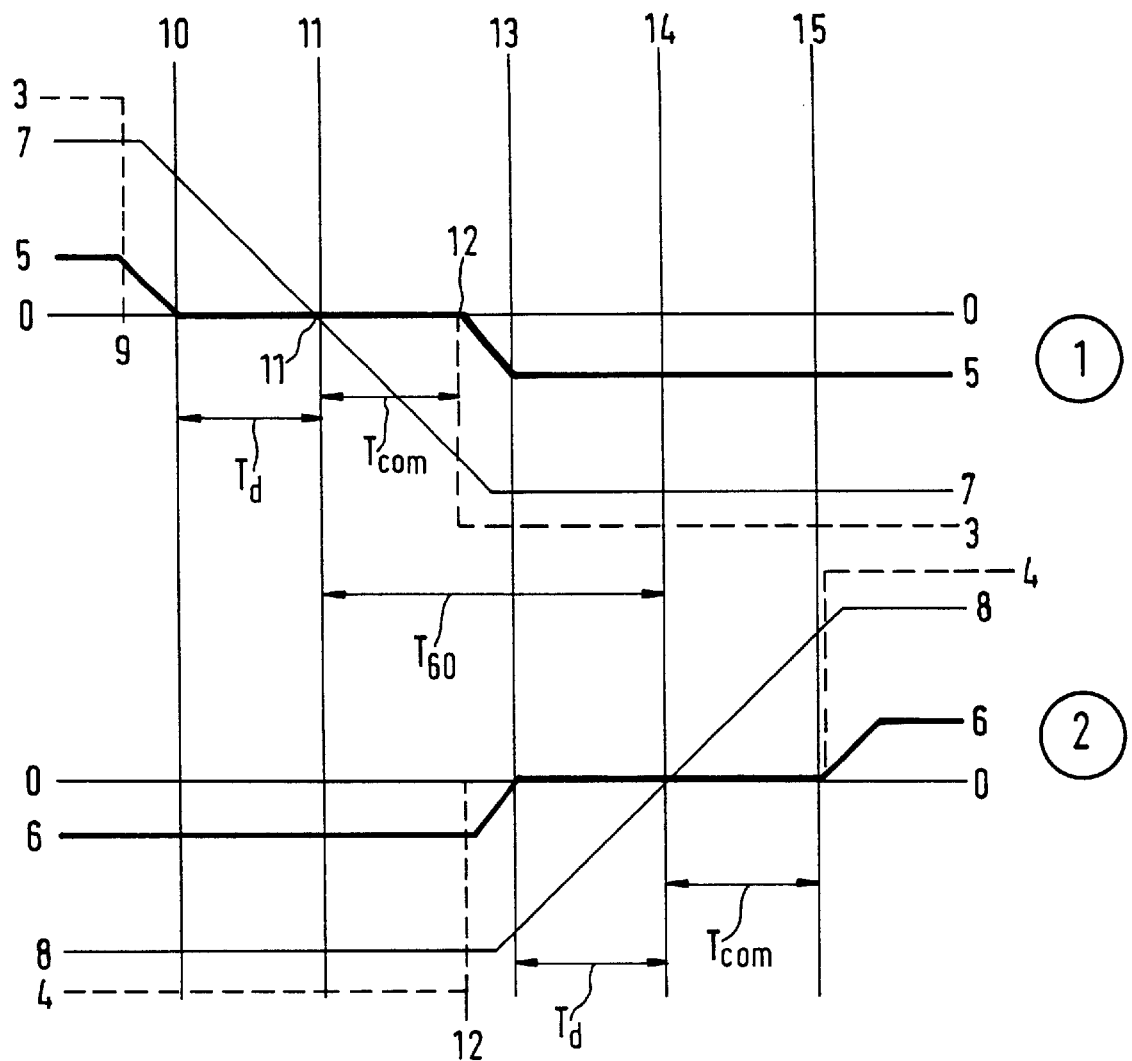

METHOD FOR THE COMMUTATION OF A POLYPHASE PERMANENT MAGNET MOTOR

BACKGROUND OF THE INVENTION

The invention relates to a method for the commutation of an electronically commutated, brushless, polyphase permanent magnet motor.

Polyphase permanent magnet motors nowadays are commutated increasingly electronically, i.e. brushlessly. The rotating rotary field in the stator winding with this is electronically produced, for example by way of a voltage/frequency converter. In order to be able to optimally convert the electrical power into mechanical motor power and in order to ensure a motor running which is as low vibration, smooth and low-noise as possible, it is necessary to synchronize the speed between the electronically produced circulating rotary field of the stator and the permanent magnet or magnets circulating therein. For this a position acquirement of the rotor is required which may either be effected by sensors provided on the stator side, for example Hall sensors but also by way of acquisition of the intrinsic induction arising in the stator windings. The first requires a measurement effort which is not inconsiderable, for the acquisition as well as for evaluation. The latter however in practice is only possible with the help of a separate measurement winding or however with block-commutated motors, since a measurement of the intrinsic induction without a great effort with regard to measurement technology is only possible in the phase without supply voltage when the voltage arising by way of intrinsic induction in the motor phase winding is not superimposed by the external supply voltage.

From U.S. Pat. No. 4,654,566 it is known, by acquiring the voltage induced within a winding, to determine the rotor position and to commutate the motor in dependence of the evaluated rotor position, i.e. specifically to determine the zero crossing of the voltage induced by the intrinsic induction in a motor winding and to carry out the reapplication of this motor winding to the supply voltage at a certain angle (commutating angle) from this point on. With this method the commutating point in time is matched to the current/present rotor position in that the commutating angle or the time interval determined by way of the dependence of the rotor speed is fixed from the zero crossing of the voltage induced in a motor winding. With this the commutation is always effected in dependence on the current position, however the commutation angle is always the same. An optimization of the commutating angle may however only be effected in dependence on the rotary speed so that the commutating method known from the above mentioned US patent can only be usefully applied when the motor is operated at a constant rotational speed.

BRIEF SUMMARY OF THE INVENTION

Proceeding from this it is the object of the present invention to improve a commutating method of the specified type to the extent that with a low measuring effort an adaptation of the commutation angle may be effected in order to adapt the speed of the rotary field rotating in the stator to that of the rotor, and to ensure a low-vibration and smooth running of the motor in all rotational speed regions.

In one aspect, this invention comprises a method for commutating an electronically commutated brushless three phase permanent magnet motor (BLDC motor) in which the rotor position with respect to the stator and to the rotary field rotating therein is determined by way of the intrinsic induction in at least one motor winding, and the application of the external voltage to the motor winding is adapted, with respect to time, corresponding to the predetermined rotor position, wherein at least one motor winding the time from the point in time at which the winding current after switching off the voltage has essentially assumed the value zero until the zero crossing of the voltage induced in this winding is evaluated and in dependence on this time the external voltage, is again applied to this winding.

The method according to the invention is based on the principle that the commutation angle, i.e. the angle between the zero crossing of the voltage induced in a winding until reapplying to the same winding the supply voltage, is adapted in dependence on the deviation, between the rotary field rotating in the stator and the magnetic field circulating with the rotor, from the directed position. Since this adaptation is effected in every operating condition of the motor it is not only ensured for a certain rotational speed but for every possible speed. By way of this a higher efficiency and smoother running of the motor over the whole rotational speed range is ensured. Complicated measurements for acquiring the phase shifting as well as for computing the commutation angle are not required, only an acquisition of the time or of the angle from the zero crossing of the winding current up to the zero crossing of the voltage induced in this winding is required as well as a suitable control which, after a time interval dependent on this time or angle, preferably however of the same magnitude or after a preferably equal angle again dependent on this, effects the commutation, i.e. the reapplication of this winding to the supply voltage. This may be effected without further ado by way of the usually preconnected converter with a suitable control. The acquisition of the point in time when the winding phase current becomes zero as well as that of the zero crossing of the voltage induced in this winding have been known for a long time, the formation of a suitable control for commutating the motor in the above mentioned manner is clear to the man skilled in the art, which is why it is not gone into in detail here.

The method according to the invention thus with a relatively low expense with regard to measuring technology and control technology permits an adaptation of the commutation angle at each operating condition of the motor, in particular at each rotational speed. By way of this not only the efficiency but also the smoothness of running and noise emission of the motor is improved.

Preferably the commutation time is selected such that this is equal to the time in which computed from when the phase current becomes zero the zero crossing of the induced voltage is effected since then there is effected an excitation of the motor which is symmetric with respect to the zero crossing of the induced voltage, this favoring a smooth and low-noise running of the motor. It is however also conceivable that with special cases of application or motor designs a commutation time differing from this is selected, which however in any case is dependent on the previously evaluated time.

Advantageously the method according to the invention is applied in succession in each phase winding (this is to be understood as one or more motor windings which are allocated to the same phase), in order thus to ensure an exact as possible adaptation of the commutation angle to the actual motor condition.

Usefully the measurement of the intrinsic induction in the respective winding is effected only when this motor winding is separated from the voltage supply, in order to avoid a superposition of the external supply voltage and the internal induction voltage. The voltage then applied at the winding is caused exclusively by intrinsic induction and represents in the known manner the BEMF signal (back electromotive force).

BRIEF DESCRIPTION OF THE DRAWINGS

The invention is hereinafter described by way of an embodiment example shown in the drawing.

DETAILED DESCRIPTION OF THE INVENTION

The drawing shows the schematic course of supply voltage, motor current and BEMF signal of two windings commutated after one another, of an electronically commutated polyphase permanent magnet motor. Two (of the in total three or where appropriate more) motor phase windings, which are commutated in succession, are indicated in the FIGURE with 1 and 2. The interrupted lines 3 and 4 indicate the course with respect to time of the supply voltages in the windings 1 and 2. The thick continuous lines 5 and 6 indicate the current course with respect to time in these motor phase windings. The thin continuous lines 7 and 8 indicate the temporal course of the induced voltages (BEMF) in the respective motor phase winding. The current courses with respect to time according to the lines 3 and 4, the current courses with respect to time according to the lines 5 and 6 as well as the courses with respect to time of the inherent induction according to the lines 7 and 8 are in each case relative to a zero line, wherein values above the zero line are positive and values there below are negative.

If one observes the motor phase winding 1, it becomes clear that this firstly is triggered with a positive supply voltage 3 which at the point in time 9 is switched off. As results by way of the associated winding current course 5 the winding phase current 5 falls after switching off the voltage 3 to zero, this point in time is indicated at 10. The voltage 7 induced in the same motor phase winding 1 likewise falls after switching off the supply voltage 3, wherein in a temporal distance $T_d$ at the point in time 10 the voltage 7 has fallen to zero. This point in time is indicated at 11. At the point in time 12 then the supply voltage 3 is again applied to the motor phase winding 1, then however with a reverse polarity. The winding phase current 5 then again increases from the point in time 12 with respect to the magnitude, however this time corresponding to the negative supply voltage 3 in the reverse direction.

If one now considers the motor phase winding 2, one recognizes the voltage loading of this winding which is effected displaced to the motor phase winding 1, as this is basically common and known with block-commutated motors of this type. Thus in the time space of 9 to 12 the supply voltage 4 in the motor phase winding 2 is negative, whilst at point in time 12 falls to zero and the supply voltage of the motor phase winding 1 becomes negative. The winding phase current 6 runs firstly constant until after switching off the supply voltage 4 at the point in time 12 falls and finally at the point in time 13 assumes the value zero. Whilst the supply voltage 4 and the winding current 6 remain zero, the induced voltage 8 rises to zero. This point in time zero is indicated at 14. Whilst the winding phase current 6 and the supply voltage 4 in this second motor phase winding 2 continue to be zero, then the induced voltage 8 again increases. At the point in time 15 there is effected the commutation, i.e. the reswitching of the supply voltage 4 of the second motor phase winding 2, whereupon the winding phase current 6 again increases. From the point in time 15 the motor phase winding 2 is loaded with a positive voltage, the motor phase winding 1 further with a negative one.

Whilst one according to the state of the art continuously keeps the commutation angle constant and one determines the phase position between the rotor and the stator by way of a time $T_{60}$ which is determined by two zero crossings, in succession, of the induced voltage in two successive motor phase windings and by way of this the rotor speed is evaluated, the present invention proceeds in the following way. Preferably in each motor phase winding separately the time $T_d$ is evaluated, between the point in time when the winding phase current reaches the value zero, and the point in time when the zero-passage of the induced voltage is effected in the same motor phase winding. This time $T_d$ or the angle corresponding to this time determines the commutation angle, i.e. the time between the zero-crossing of the induced voltage of the motor phase winding connected free of the supply voltage and the re-application of the supply voltage to this motor phase winding. Since this time $T_d$ is measured or determined in each motor phase winding, by way of this also the commutation time $T_{com}$ or the corresponding commutation angle are continuously adapted, by which means there results a very quick adaptation of the commutation angle to the actual motor condition, i.e. rotational speed, loading, etc. It has been shown that exactly this choice of commutation angle is particularly advantageous and ensures a particularly uniform and smooth running of the motor and thus also a high motor efficiency, and specifically at differing rotational speeds and loading conditions. By way of the fact that the time space between achieving the zero line of the phase currents up to the zero crossing of the induced voltage and the time space from the zero-passage of the induced voltage up to the application of the supply voltage to the motor phase winding are equal, there continuously results a symmetrical excitation of the motor about the zero crossing of the BEMF signal, by which means the phase shifting between the rotary field of the stator and that of the rotor is minimized with respect to the directed position, and the efficiency is increased.

In detail the commutation is effected in the following manner:

In the motor phase winding 1 then when the supply voltage 3 is switched off, i.e. set to zero, the winding phase current 5 is detected, in particular the point in time 10 at which the winding current becomes zero. Furthermore the voltage 7 induced in this winding is measured, which may be effected either by way of a Hall sensor but also by way of voltage measurement in this motor phase winding 1 itself, at least for so long as the supply voltage 3 is zero. This zero crossing is reached at the point in time 11, by which means the time $T_d$, thus the time between the point in time 10 when the winding phase current 5 has reached zero until the point in time 11 at which the induced voltage 7 has reached zero, is determined. This time $T_d$ then determines the subsequent commutation angle $T_{com}$, i.e. the time after which the supply voltage 3 is again applied to this winding 1, computed from the zero passage 11 of the induced voltage 7.

$$T_d = T_{com}$$

In the same way one proceeds in the motor phase winding 2. At the point in time 12 the supply voltage is switched off, thereafter the winding phase current 6 rises to zero which is reached at the point in time 13. The voltage 8 induced in this winding 2 likewise increases and reaches at the point in time 14 the zero point. The time interval formed between the points in time 13 and 14 is $T_d$ and determines the subsequent commutation angle $T_{com}$ which corresponds to $T_d$. At the point in time 15 then the supply voltage 4 is again applied to this winding, and specifically with a reverse polarity, as this is usual with three-phase motors with which continuously in a motor phase winding there prevails a positive voltage, in another motor phase winding a negative voltage and in the third motor phase winding no supply voltage.

The evaluation of the time $T_d$ is relatively simple with regard to measuring technology, since it is neither necessary to determine the current course of the BEMF signal, rather it is sufficient in each case to determine the reaching of the zero line or the zero crossing and the time space lying there between.

What is claimed is:

1. A method for commutating an electronically commutated brushless three phase permanent magnet motor in which the rotor position with respect to the stator and to the rotary field rotating therein is determined by way of the intrinsic induction in at least one motor winding, and the application of the external voltage to the motor winding is adapted, with respect to time, corresponding to the determined rotor position, wherein at least one motor winding, the time from the moment in which the winding current, after switching off the voltage, is essentially zero, until the zero crossing of the voltage induced in this winding is evaluated, and depending upon this time the external voltage is again applied to this winding; wherein after the same time, which passes from the point in time at which the winding current after switching off the voltage, is essentially zero until the zero crossing of the voltage induced in this winding, computed from the zero crossing of the induced voltage, the voltage is again applied to this winding.

2. A method for commutating an electronically commutated brushless three phase permanent magnet motor in which the rotor position with respect to the stator and to the rotary field rotating therein is determined by way of the intrinsic induction in at least one motor winding, and the application of the external voltage to the motor winding is adapted, with respect to time, corresponding to the determined rotor position, wherein at least one motor winding, the time from the moment in which the winding current, after switching off the voltage, is essentially zero, until the zero crossing of the voltage induced in this winding is evaluated, and depending upon this time the external voltage is again applied to this winding, wherein in each motor winding the time from the moment in which the winding current, after switching off the voltage, is essentially zero until the zero crossing of the voltage induced in this winding is evaluated, and the external voltage after the same time, computed from the zero crossing of the induced voltage is again applied to this winding.

3. A method according to claim 1, wherein the measurement of the induced voltage is effected when the corresponding winding is separated from the supply network or is connected without voltage.

4. A method according to claim 2, wherein the measurement of the induced voltage is effected when the corresponding winding is separated from the supply network or is connected without voltage.

* * * * *